United States Patent
Yasunaga

(10) Patent No.: US 8,192,670 B2
(45) Date of Patent: Jun. 5, 2012

(54) TIRE FORMING MOLD AND TIRE MANUFACTURING METHOD

(75) Inventor: Toshikazu Yasunaga, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 743 days.

(21) Appl. No.: 12/238,534

(22) Filed: Sep. 26, 2008

(65) Prior Publication Data
US 2009/0120561 A1 May 14, 2009

(30) Foreign Application Priority Data
Nov. 12, 2007 (JP) .................. 2007-293355

(51) Int. Cl.
*B29C 35/02* (2006.01)
(52) U.S. Cl. .................. 264/326; 425/46; 425/215
(58) Field of Classification Search .......... 425/28.1, 425/46, 215; 264/326
See application file for complete search history.

(56) References Cited

U.S. PATENT DOCUMENTS

| | | | | | |
|---|---|---|---|---|---|
| 1,416,362 | A | * | 5/1922 | Lambert | 425/46 |
| 1,673,525 | A | * | 6/1928 | Nelson | 425/36 |
| 4,655,699 | A | * | 4/1987 | Collier | 425/46 |
| 5,415,826 | A | * | 5/1995 | Lange et al. | 264/326 |

FOREIGN PATENT DOCUMENTS

| | | | |
|---|---|---|---|
| DE | 100 36 999 | * | 2/2002 |
| JP | 63-161806 | | 10/1988 |
| JP | 2000-108130 | | 4/2000 |
| JP | 2008-307800 | | 12/2008 |

OTHER PUBLICATIONS

Office Action for Japanese Application No. 2007-293355 dated Mar. 23, 2012.

* cited by examiner

*Primary Examiner* — James Mackey
(74) *Attorney, Agent, or Firm* — Fish & Richardson P.C.

(57) ABSTRACT

A tire forming mold has a side mold portion and an annular mold portion fitted to an outer side in a tire diametrical direction of the side mold portion at a time of clamping the mold, wherein the annular mold portion is constructed by a combination of sectors which are divided in a tire circumferential direction, and each of the sectors is capable of displacing in the tire diametrical direction, wherein a fitting diameter of the annular mold portion is set to be equal to or more than a fitting diameter of the pair of side mold portions, an annular rubber introduction groove extending along the tire circumferential direction is provided at least in one of a fitting surface of the annular mold portion and a fitting surface of the pair of side mold portions, and a shallow groove portion is formed in an introduction port of the rubber introduction groove.

6 Claims, 5 Drawing Sheets

(a) The mold clamp state  (b) The mold open state

TIRE FORMING MOLD AND TIRE MANUFACTURING METHOD

BACKGROUND OF THE INVENTION

1. Field of the Invention

The present invention relates to a tire forming mold for vulcanization forming a tire and a tire manufacturing method using the tire forming mold.

2. Description of the Related Art

The tire forming mold mentioned above is constructed by combining a plurality of mold portions, and can be roughly classified into a two-piece type and a segmented type based on the mold structure. The latter type is provided with an annular mold portion 11 forming an outer surface of a tread portion outer surface of a tire, and a pair of side mold portions 12 and 13 forming an outer surface of a side wall portion of the tire, as shown in FIG. 13. The annular mold portion 11 is constructed by a plurality of sectors divided in a tire circumferential direction, and the respective sectors get together so as to form an annular shape at a time of a mold clamping, and displace to an outer side in a tire diametrical direction so as to be away from each other at a time of a mold open.

The annular mold portion 11 is fitted to an outer side in a tire diametrical direction of the side mold portions 12 and 13 at a time of the mold clamping, and comes to a state in which a fitting surface 11a thereof is closely attached to fitting surfaces 12a and 13a of the side mold portions 12 and 13. Accordingly, the tire forming mold is worked at a high precision such that a fitting diameter D11 of the annular mold portion 11 comes to the same dimension as fitting diameters D12 and D13 of the side mold portions 12 and 13. However, if the fitting diameter D11 becomes smaller than the fitting diameters D12 and D13 due to a dispersion of work or the like, a gap is formed between the sectors at a time of the mold clamping, and a rubber burr called as a pinch is generated on a tread surface of the tire. Since this pinch is formed discontinuously on the tread surface, a removing work (a pinch cut work) becomes very complicated.

In the tire forming mold described in FIGS. 5 and 6 of Japanese Unexamined Utility Model Publication No. 63-161806 and Japanese Unexamined Patent Publication No. 2000-108130, an annular pinch is generated between the annular mold portion and the side mold portion by a groove provided in the fitting surface of the side mold portion. However, since the pinch generated thereby is formed as an approximately rectangular cross sectional shape and has a uniform thickness, a cut position with respect to the pinch is not stable particularly in the case of a manual work, which raises a problem that a cross section of a cut trace after the pinch cut is dispersed, and an appearance of the tire is deteriorated.

SUMMARY OF THE INVENTION

The preset invention is made by taking the actual condition mentioned above into consideration, and an object of the present invention is to provide a tire forming mold and a tire manufacturing method which can simplify a pinch cut work and can stabilize a cut position with respect to a pinch so as to secure an appearance of a tire.

The object can be achieved by the following present invention. That is, the present invention provides a tire forming mold comprising:

a pair of side mold portions forming an outer surface of a side wall portion of a tire;

an annular mold portion fitted to an outer side in a tire diametrical direction of the pair of side mold portions at a time of clamping the mold and forming an outer surface of a tread of the tire;

the annular mold portion being constructed by a combination of sectors which are divided in a tire circumferential direction; and each of the sectors being capable of displacing in the tire diametrical direction, wherein a fitting diameter of the annular mold portion is set to be equal to or more than a fitting diameter of the pair of side mold portions, an annular rubber introduction groove extending along the tire circumferential direction is provided at least in one of a fitting surface of the annular mold portion and a fitting surface of the pair of side mold portions, and a shallow groove portion is formed in an introduction port of the rubber introduction groove.

In accordance with the tire forming mold according to the present invention, since the fitting diameter of the annular mold portion is set to be equal to or more than the fitting diameter of the side mold portion, it is possible to closely attach end surfaces of the sector to each other securely at a time of the mold clamping, thereby preventing the pinch from being generated on the tread surface of the tire. On the contrary, a gap tends to be formed in a boundary surface between the annular mold portion and the side mold portion, however, in the present invention, since an annular rubber introduction groove extending along the tire circumferential direction is provided at least one of a fitting surface of the annular mold portion and a fitting surface of a pair of side mold portions, it is possible to positively generate the pinch by introducing a rubber surplus of the unvulcanized tire to the rubber introduction groove at a time of vulcanization molding. Since the pinch formed by the rubber introduction groove is formed as the annular shape which is continuous in the tire circumferential direction, the pinch cut work can be simplified. Further, since the root portion of the pinch is thinned by the shallow groove portion formed in an introduction port, the cut position with respect to the pinch becomes stable, the cross section of the cut trace after the pinch cut is not dispersed, and it is possible to secure the appearance of the tire.

In the above structure, it is preferable that the rubber introduction groove is provided only in the fitting surface of the annular mold portion.

In the present invention, since a shallow groove portion is formed in the introduction port of the rubber introduction groove, the pinch is caught on the rubber introduction groove at a time of detaching the tire from the mold after the vulcanization molding in the case where the rubber introduction groove is provided in the fitting surface of the side mold portion, and there is a risk that the pinch is cut in the root portion to be left within the mold. On the contrary, in the structure mentioned above of the present invention, since there is generated the state in which the pinch gets out of the rubber introduction groove at a time of the mold open, the pinch is not caught on the rubber introduction groove at a time of detaching the tire from the mold, and it is possible to solve the problem mentioned above.

In the above structure, it is preferable that a plurality of reinforcing groove portions formed by expanding the introduction port in such a manner as to thicken a root portion of a pinch formed by the rubber introduction groove are formed so as to be spaced in the tire circumferential direction.

In the present invention, since the shallow groove portion is formed in the introduction port of the rubber introduction groove, the shallow groove portion becomes shallower so as to excessively thin the root portion of the pinch if the number of the vulcanization makes progress and a dirt, a dust or the like is accumulated within the mold, so that there is a risk that the pinch falls away at a time of detaching the tire from the mold so as to be mixed into the mold. Accordingly, in the structure mentioned above of the present invention, since the root portion of the pinch can be reinforced by setting the reinforcing groove portion as mentioned above, it is possible to prevent the pinch from falling away from the tire so as to solve the problem mentioned above.

In the above structure, it is preferable that a back end surface of the rubber introduction groove is formed in such a manner as to come away from the fitting surface of the side mold portion little by little in accordance with going far from the introduction port.

In the present invention, since the shallow groove portion is formed in the introduction port of the rubber introduction groove, the pinch comes to a state of being enwrapped by the rubber introduction groove so as to tend to be closely attached to the fitting surface. Accordingly, in the case where the rubber introduction groove is provided only in the fitting surface of the annular mold portion, there is a tendency that the side wall portion of the tire is hard to be peeled off from the side mold portion due to the close attachment of the pinch to the fitting surface of the side mold portion. Therefore, in accordance with the structure mentioned above of the present invention, it is possible to forcibly peel the leading end of the pinch off from the fitting surface by utilizing the motion of each of the sectors at a time of opening the mold by forming a back end surface of the rubber introduction groove as mentioned above. As a result, air tends to enter into a portion between the outer surface of the side wall portion of the tire and the side mold portion, and it is possible to solve the problem mentioned above so as to improve the tire detaching characteristic from the mold.

In the above structure, it is preferable that the rubber introduction groove is provided in one of the fitting surface of the annular mold portion and the fitting surface of the pair of side mold portions, and an easy peeling treatment facilitating a rubber peeling is applied to the other of the fitting surface of the annular mold portion and the fitting surface of the pair of side mold portions all over inner and outer sides of the rubber introduction groove.

In the present invention, since the shallow groove portion is formed in the introduction port of the rubber introduction groove, the pinch comes to a state of being enwrapped by the rubber introduction groove so as to tend to be closely attached to the fitting surface. Accordingly, in the structure mentioned above of the present invention, since the easy peeling treatment as mentioned above is applied to the fitting surface in the side in which the rubber introduction groove is not provided, it is possible to improve the tire detaching characteristic from the mold by relaxing the close attachment between the pinch and the fitting surface.

Further, the present invention provides a tire manufacturing method comprising a step of vulcanization molding a tire while using a tire forming mold having a pair of side mold portions forming an outer surface of a side wall portion of a tire, and an annular mold portion fitted to an outer side in a tire diametrical direction of the pair of side mold portions at a time of clamping the mold and forming an outer surface of a tread of the tire, and structured such that the annular mold portion is constructed by a combination of sectors which are divided in a tire circumferential direction, and each of the sectors is capable of displacing in the tire diametrical direction, wherein a fitting diameter of the annular mold portion is set to be equal to or more than a fitting diameter of the pair of side mold portions, an annular rubber introduction groove extending along the tire circumferential direction is provided at least in one of the fitting surface of the annular mold portion and the fitting surface of the pair of side mold portions, and a shallow groove portion is formed in an introduction port of the rubber introduction groove, and wherein an unvulcanized tire is set to the tire forming mold so as to be clamped by the mold, and a rubber surplus of the unvulcanized tire is introduced to the rubber introduction groove at a time of the vulcanization molding.

In accordance with the tire manufacturing method according to the present invention, it is possible to positively generate the annular pinch in which the pinch cut work can be simply carried out, in the boundary surface between the annular mold portion and the side mold portion, while securely preventing the pinch between the sectors, as mentioned above. Further, since the shallow groove portion is formed in the introduction port of the rubber introduction groove forming the pinch, it is possible to thin the root portion of the pinch so as to stabilize the cut position with respect to the pinch. As a result, the cross section of the cut trace after the pinch cut is not dispersed, and it is possible to secure the appearance of the tire.

DETAILED DESCRIPTION OF THE PREFERRED EMBODIMENTS

An embodiment of the present invention will be explained with reference to the drawings.

[First Embodiment]

Figure 1:
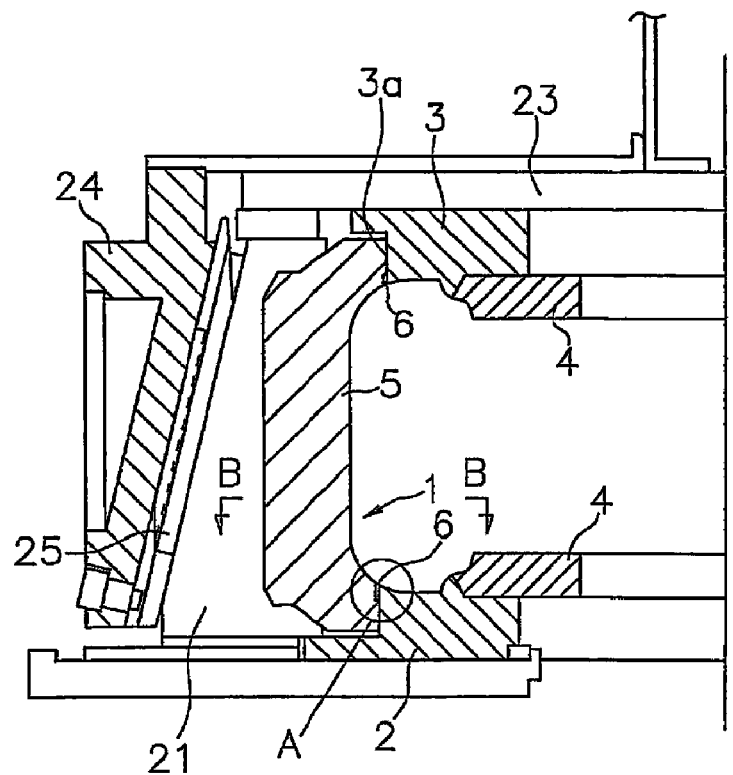
FIG. 1 is a vertical cross sectional view schematically showing an example of a tire forming mold in accordance with the present invention.

FIG. 1 is a vertical cross sectional view schematically showing an example of a tire forming mold in accordance with the present invention, and shows a mold clamping state.

Figure 2:
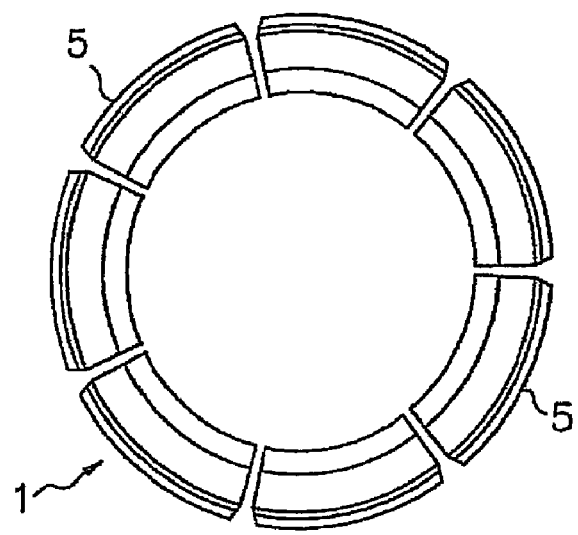
FIG. 2 is a plan view of an annular mold portion.

A right direction in FIG. 1 corresponds to an inner side in a tire diametrical direction, and a left direction corresponds to an outer side in the tire diametrical direction. FIG. 2 is a plan view of an annular mold portion.

A tire forming mold (hereinafter, refer simply to as "forming mold" in some cases) is a segmented mold provided with a pair of side mold portions 2 and 3 forming an outer surface of a side wall portion of a tire, and an annular mold portion 1 fitted to an outer side in a tire diametrical direction of the side mold portions 2 and 3 at a time of a mold clamping and forming an outer surface of a tread portion of the tire. A bead ring 4 is provided in an inner side in the tire diametrical direction of the side mold portions 2 and 3, and the structure is made such that a bead of the tire can be fitted.

The annular mold portion 1 is constituted by a combination of sectors 5 which are divided in a tire circumferential direction as shown in FIG. 2, and each of the sectors 5 is structured such as to freely displace in the tire diametrical direction. In the mold clamping state, the sectors 5 get together and are connected like a circular ring shape by bringing end surfaces thereof into contact with each other, however, in a mold open state, the respective sectors 5 displace to the outer side in the diametrical direction so as to be away from the side mold portions 2 and 3. In the present embodiment, there is shown an example in which the annular mold portion 1 is divided into seven sections and circumferential lengths of the sectors 5 are approximately identical, however, in the present invention, the dividing number of the annular mold portion 1 is not particularly limited, but the circumferential lengths of the sectors 5 may be different from each other.

An aluminum material is exemplified as a raw material of the annular mold portion 1. The aluminum material is a concept including an aluminum alloy in addition to a pure aluminum raw material, for example, there can be listed up Al—Cu, Al—Mg, Al—Mg—Si, Al—Zn—Mg, Al—Mn and Al—Si. A steel material is exemplified as a raw material of the side mold portions 2 and 3.

A container 21 is attached to a mold back surface of the annular mold portion 1. The container 21 is provided in each of the sectors 5, and is attached to a lower surface of a side plate 23 fixed to an elevating cylinder (not shown) so as to be slidable along the tire diametrical direction. A sliding rail 25 is provided in an outer inclined surface of the container 21, and a cone ring 24 is fitted so as to be slidable along a direction of inclination. The cone ring 24 is supported to a platen (not shown) which can be moved up and down relatively with respect to the side plate 23 from the above.

In a state shown in FIG. 1, if the cone ring 24 is moved up and the container 21 is moved to the outer side in the tire diametrical direction, it is possible to move each of the sectors 5 away from the side mold portions 2 and 3. If the side plate 23 and the container 21 are further move up by the elevating cylinder, it is possible to again move the sector 5 and the side mold portion 3 away from the mold portion 2 so as to give way to the mold open state. The change from the mold open state to the mold clamp state may be obtained by carrying out the motion mentioned above in reverse.

Further, although not being shown in the drawing, a rubber bag called as a bladder is installed in an inner portion of the forming mold. It is possible to press the tread surface of the tire to the inner peripheral surface of the annular mold portion 1 by expanding the bladder to the outer side in the tire diametrical direction, at a time of the vulcanization forming. Further, it is possible to use a rigid core in place of the bladder, and the present invention can be applied to either a bladder vulcanization or a core vulcanization.

Figure 3:
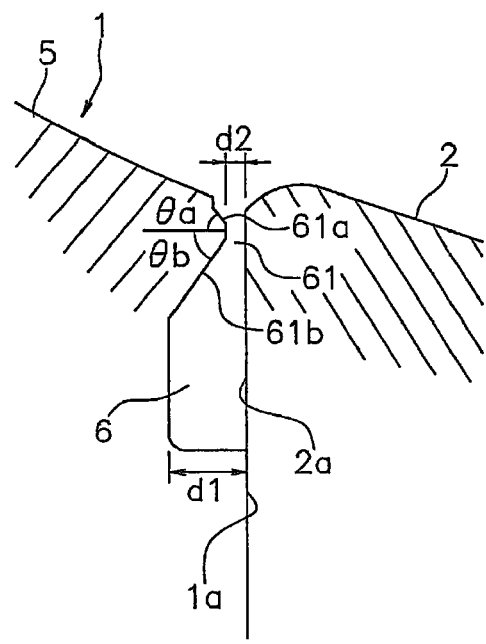
FIG. 3 is an enlarged view of a portion A in FIG. 1.

FIG. 3 is an enlarged view of a portion A in FIG. 1, and shows a boundary surface between the annular mold portion 1 and the side mold portion 2 in an enlarged manner. A boundary surface between the annular mold portion 1 and the side mold portion 3 is also formed in a similar manner. In a mold clamping state, the annular mold portion 1 is fitted to an outer side in the tire diametrical direction of the side mold portions 2 and 3, and the fitting surface 1a is brought into contact with or is made close to the fitting surfaces 2a and 3a of the side mold portions 2 and 3.

In the present invention, a fitting diameter D1 of the annular mold portion 1 is set equal to or more than fitting diameters D2 and D3 of the side mold portions 2 and 3. Accordingly, it is possible to closely attach end surfaces of the sectors 5 to each other securely at a time of the mold clamping so as to prevent the pinch from being generated on the tread surface of the tire. In the light of securely achieving the effect mentioned above, it is preferable that the fitting diameter D1 is larger than the fitting diameters D2 and D3, and it is preferable that a diameter difference therebetween is about 0.05 mm to 0.1 mm. In this case, the fitting diameter D1 comes to an inner diameter of the fitting surface 1a at a time of the mold clamping, and the fitting diameters D2 and D3 come to outer diameters of the fitting surfaces 2a and 3a.

Further, in the forming mold in accordance with the present invention, an annular rubber introduction groove extending along a tire circumferential direction is provided at least in one of the fitting surfaces of the annular mold portion and the fitting surface of the side mold portion. In the present embodiment, as shown in FIG. 3, there is shown an example in which a rubber introduction groove 6 is provided only in the fitting surface 1a of the annular mold portion 1. A groove depth d1 of the rubber introduction groove 6 is, for example, between 1.0 and 3.0 mm. A shallow groove portion 61 is formed in an introduction port of the rubber introduction groove 6, and a depth d2 of the shallowest position of the shallow groove portion 61 is, for example, between 0.1 and 1.3 mm. The depths d1 and d2 correspond to a depth based on the fitting surface 1a of the annular mold portion 1.

If the fitting diameter D1 is equal to or more than the fitting diameters D2 and D3 as mentioned above, a gap tends to be formed in the boundary surface between the annular mold portion 1 and the side mold portions 2 and 3, however, in the present invention, it is possible to introduce a rubber surplus of the unvulcanized tire at a time of the vulcanization molding so as to positively generate the pinch by setting the rubber introduction groove 6 in the boundary surface. Since the pinch is formed as the annular shape which is continuous in the tire circumferential direction, the pinch cut work can be simplified as mentioned below. Further, since the root portion of the pinch is thinned by the shallow groove portion 61, the cut position with respect to the pinch becomes stable, the cross section of the cut trace after the pinch cut is not dispersed, and it is possible to secure the appearance of the tire.

In the present embodiment, the shallow groove portion 61 has a taper bottom surface 61a in which the groove depth is gradually decreased from the introduction port of the rubber introduction groove 6 toward a back end surface, and a taper bottom surface 61b in which the groove depth is gradually increased from the taper bottom surface 61a toward the back end surface, and is formed as a pinched shape for smoothening the introduction of the rubber. It is preferable that angles θa and θb of incline of the taper bottom surfaces 61a and 61b with respect to the tire diametrical direction are respectively between 30 and 70 degree.

Next, a description will be given of a method of manufacturing the tire by using the forming mold mentioned above.

First of all, the unvulcanized tier is set to the forming mold, and the mold is clamped. At this time, since the fitting diameter D1 is equal to or more than the fitting diameters D2 and D2, it is possible to closely attach the end surfaces of the sectors 5 to each other securely. Next, the vulcanization molding is carried out by inflating the bladder, pressing the outer surface of the tread portion of the tire to the inner peripheral surface of the annular mold portion 1, pressing the outer surface of the side wall portion to the inner peripheral surface of the side mold portions 2 and 3, and heating and retaining at a predetermined vulcanizing temperature. At a time of the vulcanization molding, the rubber surplus of the tire is introduced to the rubber introduction groove 6 and the annular pinch is formed.

Figure 4:
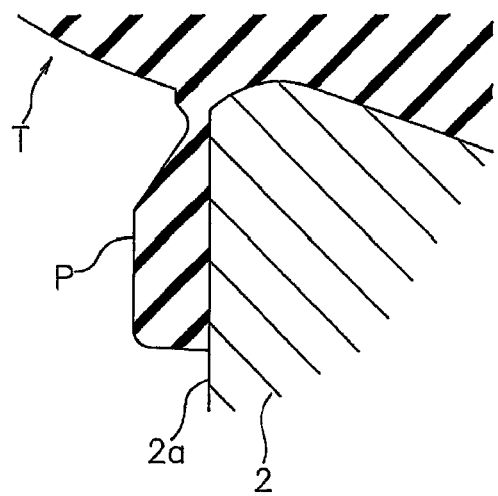
FIG. 4 is an enlarged view of a substantial part at a time of opening a mold after a vulcanization forming.
Figure 5:
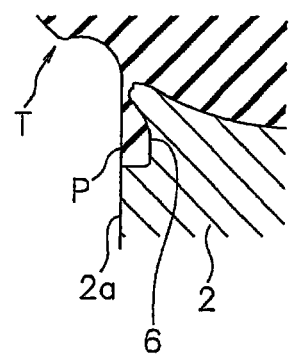
FIG. 5 is an enlarged view of a substantial part at a time of providing a rubber introduction groove in a side mold portion.

After finishing the vulcanization molding, the tire is detached from the mold by opening the mold. In the mold open state, each of the sectors 5 displaces to the outer side in the tire diametrical direction so as to be away from the side mold portion 2, and there is generated a state in which a pinch P gets out of the rubber introduction groove 6 as shown in FIG. 4. Accordingly, the pinch P is not caught on the rubber introduction groove 6 at a time of detaching a tire T from the mold. In the present invention, as shown in FIG. 5, the rubber introduction groove 6 may be provided in the fitting surface 2a of the side mold portion 2, however, in the case mentioned above, since the pinch P exists within the rubber introduction groove 6 even if the mold is opened, the pinch P is caught on the rubber introduction groove 6 at a time of detaching the tire T from the mold, and there is a risk that the pinch P is cut at the root portion so as to be left within the mold. Therefore, in the present invention, it is preferable that the rubber introduction groove 6 is provided only in the fitting surface 1a of the annular mold portion 1.

Subsequently, in a state in which the detached tire is mounted on a turn table, and a cutter is applied to the pinch, the pinch is removed by turning the tire in the tire circumferential direction. The pinch cut work is simple in comparison with a case aiming at a pinch formed between the sectors 5, and a cut time is shortened. Further, as shown in FIG. 4, since the root portion of the pinch P is thinned by the shallow groove portion 61, it is easy to stabilize a cut position (a position to which the cutter is applied) with respect to the pinch P. Accordingly, the cross section of the cut trace after the pinch cut is not dispersed, and it is possible to secure an appearance of the pneumatic tire corresponding to the product.

EXAMPLE 1

In a tire forming mold for vulcanization forming a pneumatic tire having a tire size 215/60R16, an example 1 was obtained by setting the rubber introduction groove shown in the first embodiment. A diameter difference between the fitting diameter D1 and the fitting diameters D2 and D3 was set to 0.05 mm, and a dimension of the rubber introduction groove was set to $d1=1.5$ mm, $d2=0.4$ mm, $\theta a=56.31$ degree, $\theta b=53.75$ degree. As a result, in the example 1, with respect to the molding of fifty tires, a pinch generating number between the sectors was 0, a pinch cut working time was one fifth in comparison with the conventional one, and an appearance of the tire was good.

[Second Embodiment]

Since second to fourth embodiments have the same structure and operation as those of the first embodiment except the following structures of the rubber introduction groove or the peripheral structure thereof, a description will be given mainly of different points by omitting the common points. In this case, the same reference numerals are attached to the same members and positions as the already described members and positions in the description of the first embodiment, and an overlapping description will be omitted.

Figure 6:
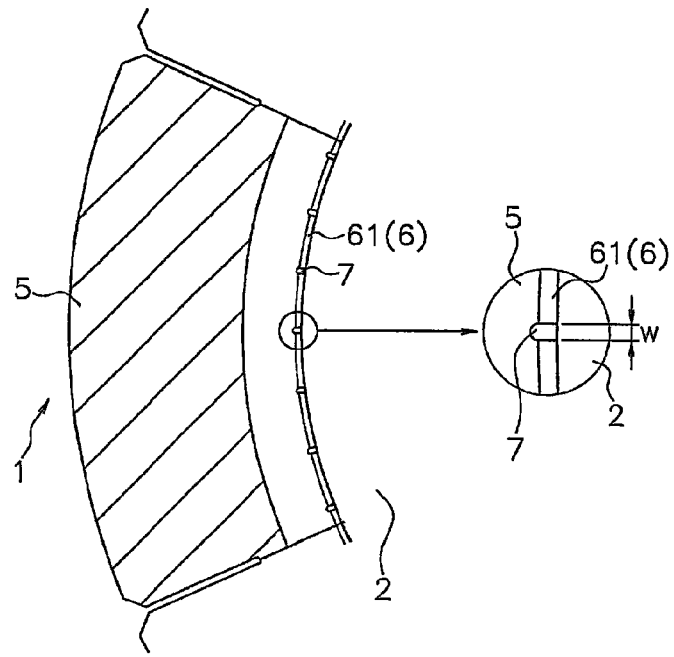
FIG. 6 is a plan view showing a boundary surface between an annular mold portion and a side mold portion of a tire forming mold in accordance with a second embodiment of the present invention.
Figure 7:
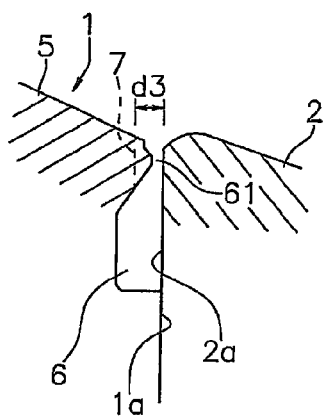
FIG. 7 is a cross sectional view showing a substantial part of a tire forming mold in FIG. 6 in an enlarged manner.

FIG. 6 is a plan view showing a boundary surface between an annular mold portion 1 and a side mold portion 2 of a tire forming mold in accordance with a second embodiment of the present invention, corresponds to a cross sectional view as seen from an arrow B-B in FIG. 1. FIG. 7 is a cross sectional view showing a substantial part of the tire forming mold in an enlarged manner.

In the present embodiment, reinforcing groove portions 7 as shown in FIG. 6 are formed at a plurality of positions (seven positions in the present embodiment) so as to be spaced in the tire circumferential direction. The reinforcing groove portion 7 is formed by expanding the introduction port so as to thicken the root portion of the pinch formed by the rubber introduction groove 6 and is formed deeper than the shallow groove portion 61. In accordance with the structure mentioned above, since the root portion of the pinch is reinforced even if the dirty, the dust and the like are piled and the shallow groove portion 61 becomes shallow, it is possible to prevent the pinch from falling away at a time of detaching the tire from the mold. The reinforcing groove portions 7 are provided at two to ten positions per one sector 5, a groove depth d3 thereof is, for example, between 0.5 and 3.0 mm, and a groove width w is, for example, between 0.3 and 3.0 mm.

Figure 8:
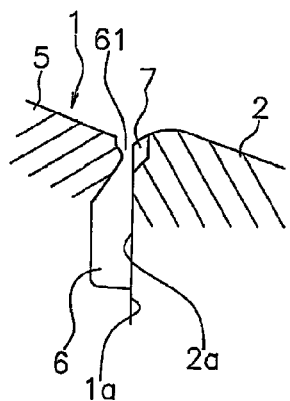
FIG. 8 is an enlarged view of a substantial part at a time of providing a reinforcing groove portion in the side mold portion.

The reinforcing groove portion 7 may be provided at positions opposing to the shallow groove portion 61 of the rubber introduction groove 6 if the reinforcing groove portion 7 expands the introduction port of the rubber introduction groove 6. For example, as shown in FIG. 8, the reinforcing groove portion 7 maybe provided in the fitting surface 2a of the side mold portion 2 in such a manner as to oppose to the shallow groove portion 61 of the rubber introduction groove 6 provided in the fitting surface 1a of the annular mold portion 1. Even in this case, a plurality of reinforcing groove portions 7 are formed so as to be spaced in the tire circumferential direction.

EXAMPLE 2

In a tire forming mold for vulcanization forming a pneumatic tire having a tire size 215/60R16, an example 2 was obtained by setting the rubber introduction groove with reinforcing groove portions shown in the second embodiment. The reinforcing groove portions were provided at seven positions up and down respectively in each of the sectors, and a dimension thereof was set to $d3=0.75$ mm, $w=0.5$ mm. A dimension of the rubber introduction groove was set to the same as the example 1. As a result, the pinch falling generating number in the molding of two thousands of tires was twenty in the case where the reinforcing groove portion is not provided while the pinch falling generating number in the molding of two thousands of tires was 0 in the structures in FIGS. 7 and 8 in accordance with the example 2.

[Third Embodiment]

Figure 9:
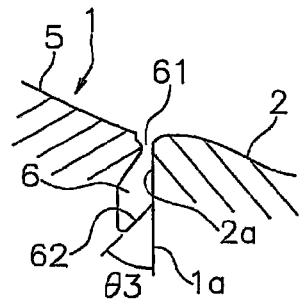
FIG. 9 is a cross sectional view showing a substantial part of a tire forming mold in accordance with a third embodiment of the present invention in an enlarged manner.

FIG. 9 is a cross sectional view showing a substantial part of a tire forming mold in accordance with a third embodiment of the present invention in an enlarged manner. In the present embodiment, as shown in FIG. 9, a back end surface 62 of the rubber introduction groove 6 is formed in such a manner as to come away from the fitting surface 2a of the side mold portion 2 little by little in accordance with going away from the introduction port. Accordingly, it is possible to solve the problem that the side wall portion of the tire is hard to be peeled off from the side mold portion 2 and it is possible to improve the mold detaching characteristic of the tire.

Figure 10:
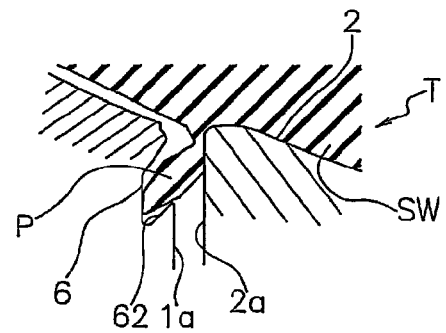
FIG. 10 is an enlarged view of a substantial part at a time of opening a mold after a vulcanization forming.

In other words, if the shallow groove portion 61 is formed in the rubber introduction groove 6, the pinch comes to a state of being enwrapped by the rubber introduction groove 6 so as to tend to be closely attached to the fitting surface 2a, which causes the side wall portion of the tire to be hard to be peeled off from the side mold portion 2. However, in accordance with the present embodiment, since the back end surface 62 catches the leading end of the pinch P so as to forcibly peel off the pinch P from the fitting surface 2a in accordance that the sector 5 displaces to the outer side in the tire diametrical direction at a time of opening the mold, as shown in FIG. 10, the air tends to enter into the portion between the side wall portion SW of the tire T and the side mold portion 2, and it is possible to improve the mold detaching characteristic of the tire.

As the angle θ3 of incline of the back end surface 62 with respect to the fitting surface 1a, 30 to 60 degree is exemplified. In the present embodiment, there is shown an example in which the back end surface 62 of the rubber introduction groove 6 is formed by a flat surface, however, may be formed by a curved surface. Further, the portion in which the back end surface 62 is formed as shown in FIG. 9 may be discontinuous on the circumference. For example, the shape in FIG. 9 may be employed at a plurality of positions spaced in the tire circumferential direction, and the shape in FIG. 3 may be employed at the remaining positions. The structure in accordance with the present embodiment may be used together with the structure in accordance with the second embodiment.

EXAMPLE 3

In a tire forming mold for vulcanization forming a pneumatic tire having a tire size 215/60R16, an example 3 was obtained by setting the rubber introduction groove shown in the third embodiment. A dimension of the rubber introduction groove was set to the same as the example 1 except θ3=45 degree. As a result, the close contact generating frequency with the side mold portion and the step interrupting time in the molding of two thousands of tires were thirty and ten hours in the rubber introduction groove shown in FIG. 3, while the close contact generating frequency and the step interrupting time in the molding of two thousands of tires were 0 and 0 hour in the example 3.

[Fourth Embodiment]

Figure 11:
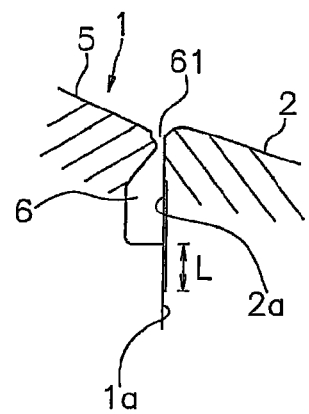
FIG. 11 is a cross sectional view showing a substantial part of a tire forming mold in accordance with a fourth embodiment of the present invention in an enlarged manner.

FIG. 11 is a cross sectional view showing a substantial part of a tire forming mold in accordance with a fourth embodiment of the present invention in an enlarged manner. In the present embodiment, as shown in FIG. 11, an easy peeling treatment for facilitating the peeling of the rubber is applied to a region extending inner and outer sides of the rubber introduction groove 6, in the fitting surface in the side which is not provided with the rubber introduction groove 6 in the fitting surface la and the fitting surface 2a, that is, the fitting surface 2a of the side mold portion 2. Specifically, a knurling work is applied.

As mentioned above, if the shallow groove portion 61 is formed in the rubber introduction groove 6, the pinch comes to the state of being enwrapped by the rubber introduction groove 6 so as to be closely attached to the fitting surface 2a easily. However, in accordance with the present embodiment, since the knurling work is applied to the region extending to the inner and outer sides of the rubber introduction groove 6 of the fitting surface 2a, the air tends to enter into the portion between the fitting surface 2a and the pinch at a time of opening the mold, and it is possible to relax the close attachment therebetween so as to improve the mold detaching characteristic of the tire. As the knurling work, it is possible to employ a parallel line (a flat line), a cross line (a twill line) and the like.

The easy peeling treatment is not limited to the knurling work, but there can be considered that the fitting surface 2a is roughened, for example, by applying a Teflon coat. It is preferable that the region to which the easy peeling treatment is applied is continuous on the circumference along the tire circumferential direction, however, may be discontinuous, and it is preferable that the protruding length L from the rubber introduction groove 6 in the region is equal to or more than 1 mm. The structure in accordance with the present embodiment can be used together with the structures in accordance with the second and third embodiments.

EXAMPLES 4 AND 5

In the tire forming mold for vulcanization molding the pneumatic tire having the tire size 215/60R16, an example 4 was obtained by providing the rubber introduction groove as shown in the fourth embodiment and applying the knurling work, and an example 5 was obtained by applying the Teflon coat in the same manner. A dimension of the rubber introduction groove was set to the same as the example 1. As a result, the close contact generating frequency with the side mold portion and the step interrupting time in the molding of two thousands of tires were thirty and ten hours in the case where the easy peeling treatment is not executed, while the close contact generating frequency and the step interrupting time in the molding of two thousands of tires were 5 and 1.8 hour in the example 4, and were 0 and 0 hour in the example 5.

[Other Embodiment]

Figure 12:
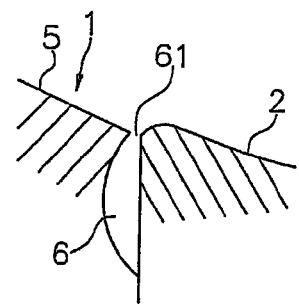
FIG. 12 is a cross sectional view showing a substantial part of a tire forming mold in accordance with another embodiment of the present invention in an enlarged manner.
Figure 13:
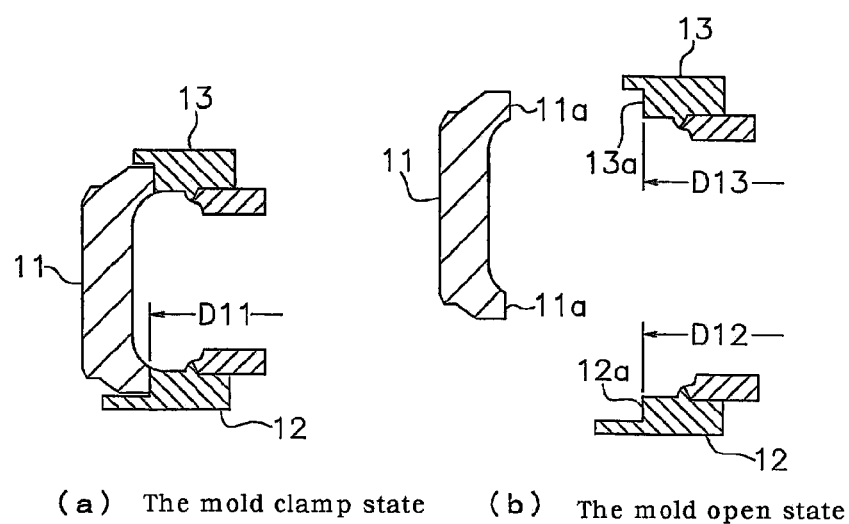
FIGS. 13(a) and 13(b) are a schematic view of an outline structure of a segmented mold.

In the present invention, the shapes and the materials of the annular mold portion and the side mold portion, and the moving mechanisms thereof and the like are not particularly limited. Further, the other shapes than the above can be appropriately employed as the rubber introduction groove, for example, a semicircular shape as shown in FIG. 12 may be employed. In the case mentioned above, it is not necessary to manufacture a bite having a special shape, and it is possible to reduce a working cost of the rubber introduction groove 6. In this case, only the shape of the shallow groove portion 61 may be set to the same as the embodiment mentioned above. In the present invention, the rubber introduction groove may be provided in both of the fitting surface of the annular mold portion and the fitting surface of the side mold portion.

What is claimed is:

1. A tire forming mold comprising:
   a pair of side mold portions forming an outer surface of a side wall portion of a tire;
   an annular mold portion fitted to an outer side in a tire diametrical direction of the pair of side mold portions at a time of clamping the mold and forming an outer surface of a tread of the tire;
   the annular mold portion being constructed by a combination of sectors which are divided in a tire circumferential direction; and
   each of the sectors being capable of displacing in the tire diametrical direction,
   wherein a fitting diameter of the annular mold portion is set to be equal to or more than a fitting diameter of the pair of side mold portions, an annular rubber introduction groove extending along the tire circumferential direction is provided in a fitting surface of the annular mold portion, and a groove portion whose shallowest depth position has a depth (d2) of between 0.1 and 1.3 mm is formed in an introduction port of the rubber introduction groove, wherein a back end surface of the rubber introduction groove is formed in such a manner as to come away from a fitting surface of the side mold portion incrementally in accordance with distance from the introduction port, and wherein when a sector displaces to the outer side in the tire diametrical direction, the back end surface of the rubber introduction groove catches a leading end of a pinch formed by the rubber introduction groove.

2. The tire forming mold according to claim 1, wherein a plurality of reinforcing groove portions formed by expanding the introduction port in such a manner as to thicken a root portion of the pinch formed by the rubber introduction groove are formed so as to be spaced in the tire circumferential direction.

3. The tire forming mold according to claim 1, wherein a treatment facilitating a rubber peeling is applied to the fitting surface of the pair of side mold portions all over inner and outer sides of the rubber introduction groove.

4. The tire forming mold according to claim 1, wherein the shallow groove portion has a first taper bottom surface in which the groove depth is gradually decreased from the introduction port of the rubber introduction groove toward the back end surface, and a second taper bottom surface in which the groove depth is gradually increased from the first taper bottom surface toward the back end surface.

5. A tire forming mold comprising:

a pair of side mold portions forming an outer surface of a side wall portion of a tire;

an annular mold portion fitted to an outer side in a tire diametrical direction of the pair of side mold portions at a time of clamping the mold and forming an outer surface of a tread of the tire;

the annular mold portion being constructed by a combination of sectors which are divided in a tire circumferential direction; and each of the sectors being capable of displacing in the tire diametrical direction, wherein a fitting diameter of the annular mold portion is set to be equal to or more than a fitting diameter of the pair of side mold portions, an annular rubber introduction groove extending along the tire circumferential direction is provided at least in one of a fitting surface of the annular mold portion and a fitting surface of the pair of side mold portions, and a groove portion whose shallowest depth position has a depth (d2) of between 0.1 and 1.3 mm is formed in an introduction port of the rubber introduction groove, and wherein a treatment facilitating a rubber peeling is applied to the other of the fitting surface of the annular mold portion and the fitting surface of the pair of side mold portions all over inner and outer sides of the rubber introduction groove.

6. A tire manufacturing method comprising a step of vulcanization molding a tire while using a tire forming mold having a pair of side mold portions forming an outer surface of a side wall portion of a tire, and an annular mold portion fitted to an outer side in a tire diametrical direction of the pair of side mold portions at a time of clamping the mold and forming an outer surface of a tread of the tire, and structured such that the annular mold portion is constructed by a combination of sectors which are divided in a tire circumferential direction, and each of the sectors is capable of displacing in the tire diametrical direction, wherein a fitting diameter of the annular mold portion is set to be equal to or more than a fitting diameter of the pair of side mold portions, an annular rubber introduction groove extending along the tire circumferential direction is provided in the fitting surface of the annular mold portion, and a groove portion whose shallowest depth position has a depth (d2) of between 0.1 and 1.3 mm is formed in an introduction port of the rubber introduction groove, wherein an unvulcanized tire is set to the tire forming mold so as to be clamped by the mold, and a rubber surplus of the unvulcanized tire is introduced to the rubber introduction groove at a time of the vulcanization molding, wherein a back end surface of the rubber introduction groove is formed in such a manner as to come away from a fitting surface of the side mold portion incrementally in accordance with distance from the introduction port, and wherein when a sector displaces to the outer side in the tire diametrical direction, the back end surface of the rubber introduction groove catches a leading end of a pinch of rubber from the rubber surplus formed by the rubber introduction groove.

* * * * *